(12) United States Patent
Tai

(10) Patent No.: US 7,509,737 B2
(45) Date of Patent: Mar. 31, 2009

(54) FAN BLADE MANUFACTURING METHODS

(75) Inventor: Jen-Lung David Tai, Glendale, AZ (US)

(73) Assignee: Air Cool Industrial Co. Ltd., Taichung (TW)

( * ) Notice: Subject to any disclaimer, the term of this patent is extended or adjusted under 35 U.S.C. 154(b) by 756 days.

(21) Appl. No.: 11/076,818

(22) Filed: Mar. 10, 2005

(65) Prior Publication Data

US 2006/0200987 A1    Sep. 14, 2006

(51) Int. Cl.
| | |
|---|---|
| B21K 21/16 | (2006.01) |
| B23P 17/00 | (2006.01) |
| B21D 53/78 | (2006.01) |
| B64C 9/00 | (2006.01) |
| B63H 1/26 | (2006.01) |

(52) U.S. Cl. ............... 29/889.7; 29/401.1; 29/412; 29/889.6; 416/23; 416/237

(58) Field of Classification Search ............ 29/889.7, 29/889.6, 889.23, 889.1; 416/243, 237, 235, 416/223 R, 225, 214 R, 132 A, 110
See application file for complete search history.

(56) References Cited

U.S. PATENT DOCUMENTS

| | | | | |
|---|---|---|---|---|
| 4,618,313 A | * | 10/1986 | Mosiewicz | ............ 416/237 |
| 4,842,633 A | * | 6/1989 | Kuribayashi et al. | ............ 65/44 |
| 4,892,460 A | * | 1/1990 | Volk | ............ 416/62 |
| 5,033,938 A | * | 7/1991 | Fraser et al. | ............ 416/224 |
| 5,246,343 A | * | 9/1993 | Windsor et al. | ............ 416/210 R |

* cited by examiner

*Primary Examiner*—David P Bryant
*Assistant Examiner*—Alexander P Taousakis
(74) *Attorney, Agent, or Firm*—Parsons & Goltry; Michael W. Goltry; Robert A. Parsons

(57) ABSTRACT

A method of manufacturing a fan blade includes providing a fan blade blank including opposed major faces, opposed inner and outer extremities, and opposed first and second sides defining opposed first and second edges, respectively. The method further specifies cutting the fan blade blank asunder into first and second parts along a cut line extending from the inner extremity of the fan blade blank to the outer extremity of the fan blade blank inboard of one of the first and second edges forming a first cut edge of one of the first and second parts and a second cut edge of the other of the first and second parts, chamfering one of the first and second cut edges forming a chamfered one of the first and second cut edges, and affixing the chamfered one of the first and second cut edges to the other of the first and second cut edges forming a fan blade consisting of the first part affixed to the second part, the first part being angled relative to the second part.

2 Claims, 14 Drawing Sheets

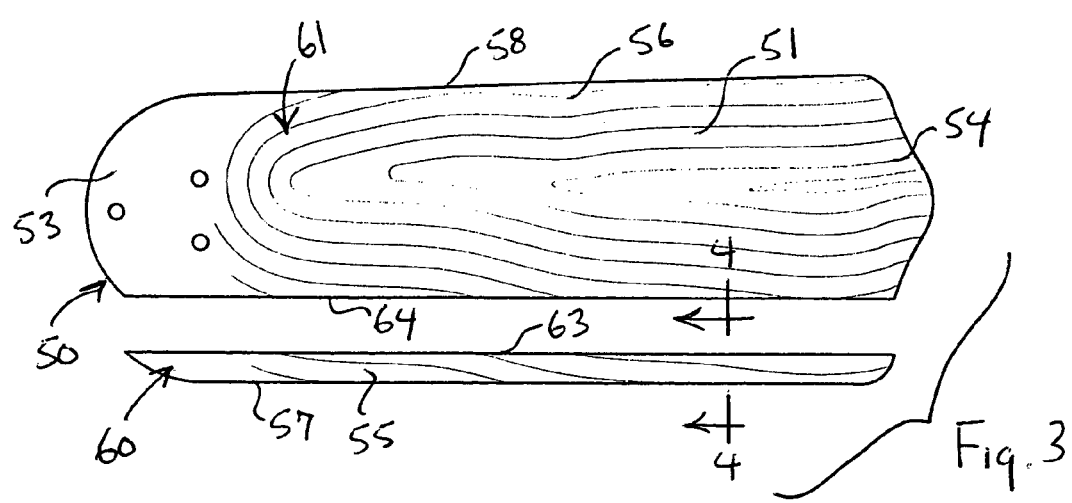
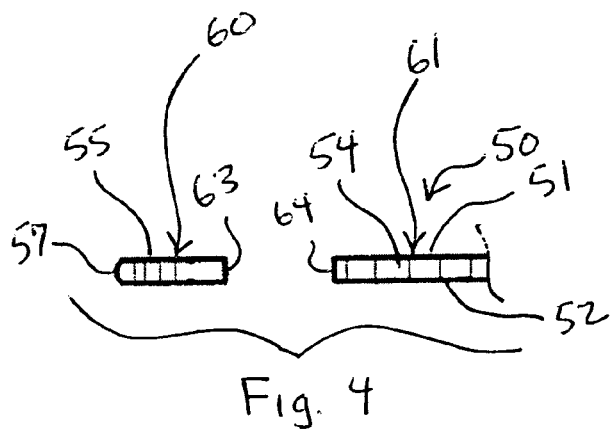

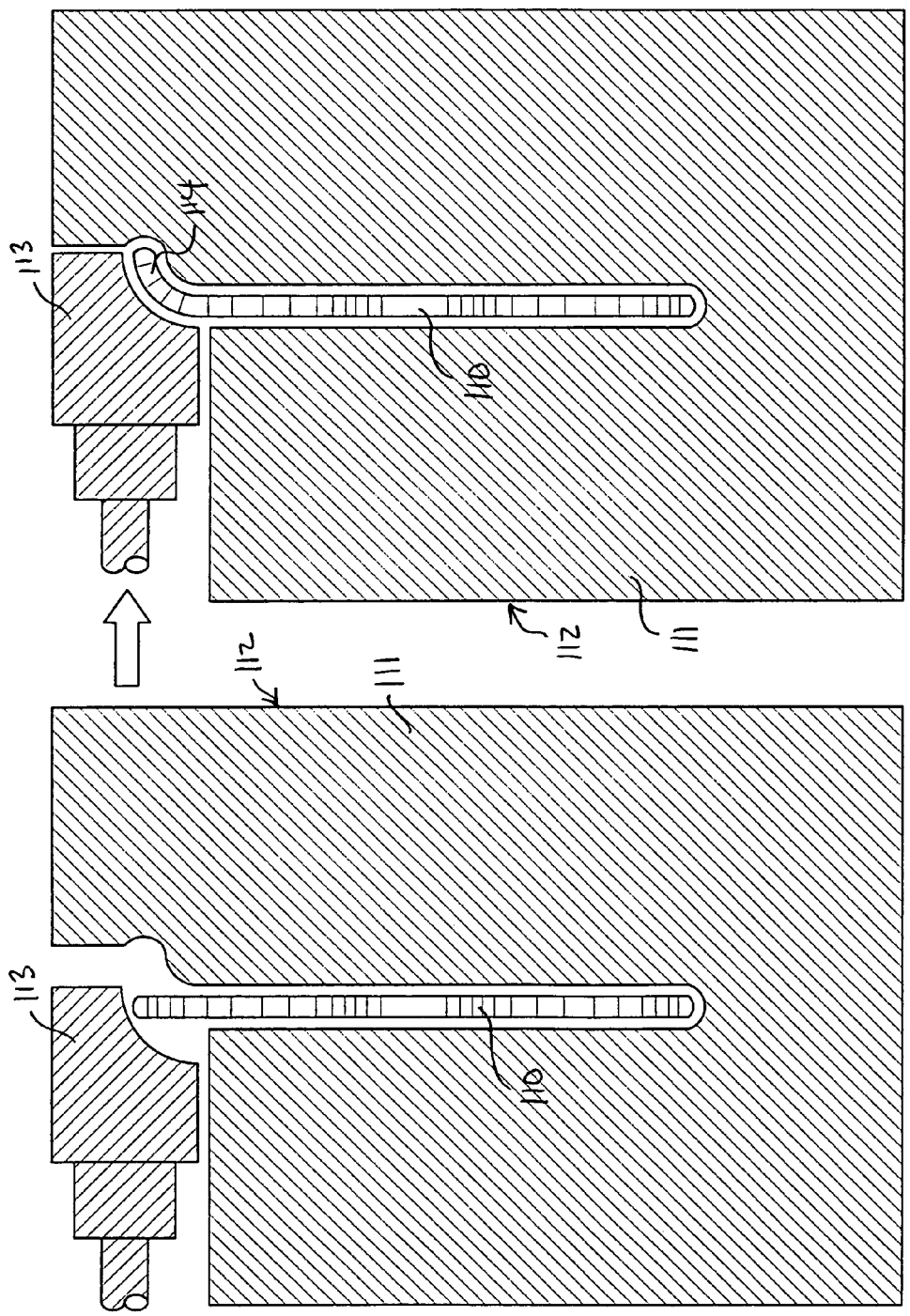

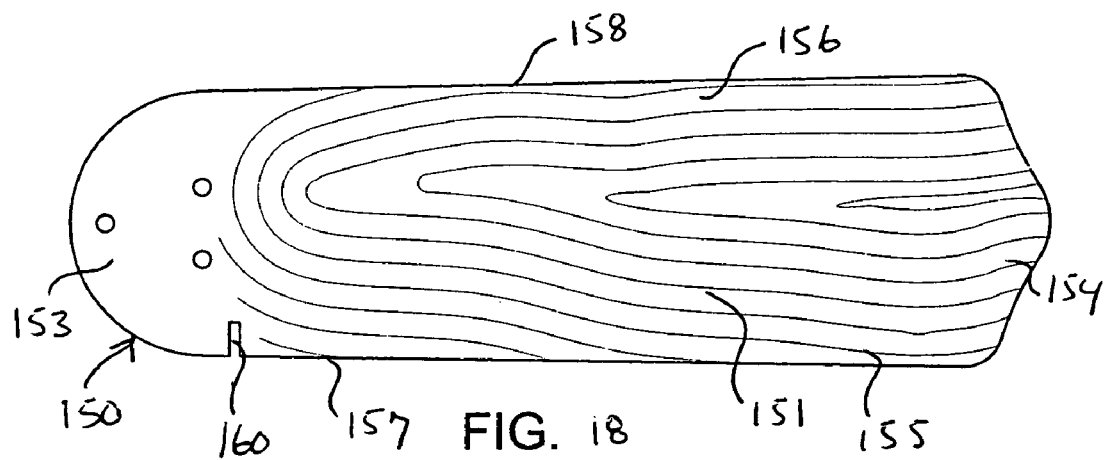
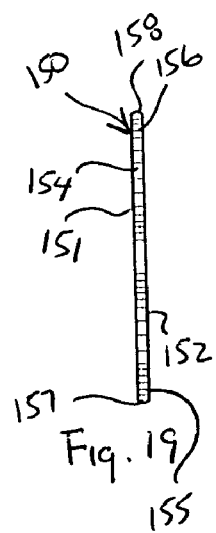

FAN BLADE MANUFACTURING METHODS

BACKGROUND OF THE INVENTION

1. Field of the Invention

The present invention relates to fan blades and, more particularly, to methods of manufacturing fan blades.

2. Related Art and Prior Art Statement

Ceiling fans are as much a part of interior décor as furniture, household accessories and artwork. Often the design of a ceiling fan is carefully chosen to match or enhance a selected interior décor. Due to the importance that is now placed on new and innovative ceiling fan designs, and because ceiling fan design is considered by many to be commensurate with fashion, tremendous effort has been directed toward the design of ceiling fans, and particularly the design of the components of ceiling fans, including fan housing, fan blades, fan blade brackets, and ceiling fan light fixtures. As a result of this focus on design, comparatively little effort has been directed of late toward improving not only the structure and function of ceiling fans, but also the methods of manufacturing ceiling fan components. Accordingly, it would be highly desirable to provide improvement methods of manufacturing ceiling fan components and, more particularly, to improved methods of manufacturing fan blades specifically adapted for use in conjunction with ceiling fans.

SUMMARY OF THE INVENTION

It is an object of the invention to provide methods of manufacturing fan blades specially adapted for use with ceiling fans, which are low in cost, simple, which require no specialized equipment, which are efficient, and which, among the foregoing and other objects, are safe, and provide fan blades that are capable of moving much more air than conventional fan blades.

According to the invention, there is provided a method of manufacturing a fan blade that includes providing a fan blade blank including opposed major faces, opposed inner and outer extremities, and opposed first and second sides defining opposed first and second edges, respectively. The method further specifies cutting the fan blade blank asunder into first and second parts along a cut line extending from the inner extremity of the fan blade blank to the outer extremity of the fan blade blank inboard of and substantially parallel to one of the first and second edges forming a first cut edge of one of the first and second parts and a second cut edge of the other of the first and second parts. Further specified are chamfering one of the first and second cut edges forming a chamfered one of the first and second cut edges, and affixing the chamfered one of the first and second cut edges to the other of the first and second cut edges forming a fan blade consisting of the first part affixed to the second part, the first part being angled relative to the second part. The step of affixing the chamfered one of the first and second cut edges to the other of the first and second cut edges further includes adhesively affixing the chamfered one of the first and second cut edges to the other of the first and second cut edges. According to the invention, there is provided a fan blade manufactured by the foregoing method.

According to the invention, another embodiment of the invention consists of a method of manufacturing a fan blade including providing a bendable fan blade including opposed major faces, opposed inner and outer extremities, and opposed first and second sides defining opposed first and second edges, respectively. The method further specifies providing a bending device having a first element and a second element, mounting the bendable fan blade to the bending device, moving the first element of the bending device relative to the second element of the bending device bending a first portion of the bendable fan blade relative to a second portion of the bendable fan blade, and removing the fan blade from the bending device. The first portion is a length of one of the first and second sides of the fan blade extending from the inner extremity to the outer extremity and being angled relative to the second portion. The method further includes mounting the bendable fan blade to the bending device, moving the first element of the bending device relative to the second element of the bending device bending a third portion of the bendable fan blade relative to the second portion of the fan blade, and removing the fan blade from the bending device. The third portion is a length of the other one of the first and second sides of the fan blade extending from the inner extremity to the outer extremity and being angled relative to the second portion. Preferably, the first portion is bent in-turned relative to one of the major faces, and the third portion is bent in-turned relative to the other one of the major faces.

According to the invention, a further embodiment of manufacturing a fan blade includes providing a bendable fan blade including opposed first and second major faces, opposed inner and outer extremities, and opposed first and second sides defining opposed first and second edges, respectively. The method further specifies forming a first notch in the fan blade, the first notch located adjacent the inner extremity and extending into the fan blade from the edge of the first side of the fan blade and through the fan blade from the first major face to the second major face, bending a first portion of the bendable fan blade relative to a second portion of the fan blade, and removing the fan blade from the bending device. The first portion is a length of the first side of the fan blade extending from the first notch to the outer extremity. The method further includes forming a second notch in the fan blade, the second notch located adjacent the inner extremity and extending into the fan blade from the edge of the second side of the fan blade and through the fan blade from the first major face to the second major face, bending a third portion of the bendable fan blade relative to a second portion of the bendable fan blade, and removing the fan blade from the bending device. The third portion is a length of the second side of the fan blade extending from the second notch to the outer extremity. In a particular embodiment, the step of bending the first portion of the bendable fan blade relative to the second portion of the fan blade includes providing a bending device having a first element and a second element, mounting the bendable fan blade to the bending device, moving the first element of the bending device relative to the second element of the bending device bending the first portion of the bendable fan blade relative to the second portion of the fan blade; and removing the fan blade from the bending device. Consistent with this the step of bending the third portion of the bendable fan blade relative to the second portion of the bendable fan blade includes mounting the bendable fan blade to the bending device, moving the first element of the bending device relative to the second element of the bending device bending the third portion of the bendable fan blade relative to a second portion of the bendable fan blade, and removing the fan blade from the bending device. Preferably, the first portion is bent in-turned relative to one of the first and second major faces, and the third portion is bent in-turned relative to the other one of the first and second major faces.

Consistent with the foregoing summary of preferred embodiments, and the ensuing detailed description, which are to be taken together, the invention also contemplates associated method embodiments, and fan blades made thereby.

BRIEF DESCRIPTION OF THE DRAWINGS

Referring to the Drawings:

FIGS. 1-10 show steps of a method of manufacturing a fan blade, in accordance with the principle of the invention;

FIG. 14 is partially schematic end elevational view of a fan blade shown as it would appear mounted to a bending device;

FIG. 15 is a view very similar to the view of FIG. 14 showing the fan blade as it would appear having been bent with the bending device;

FIGS. 18-22 illustrate steps of an alternate embodiment of a method of making a fan blade, in accordance with the principle of the invention.

DETAILED DESCRIPTION OF PREFERRED EMBODIMENTS

Figure 1:
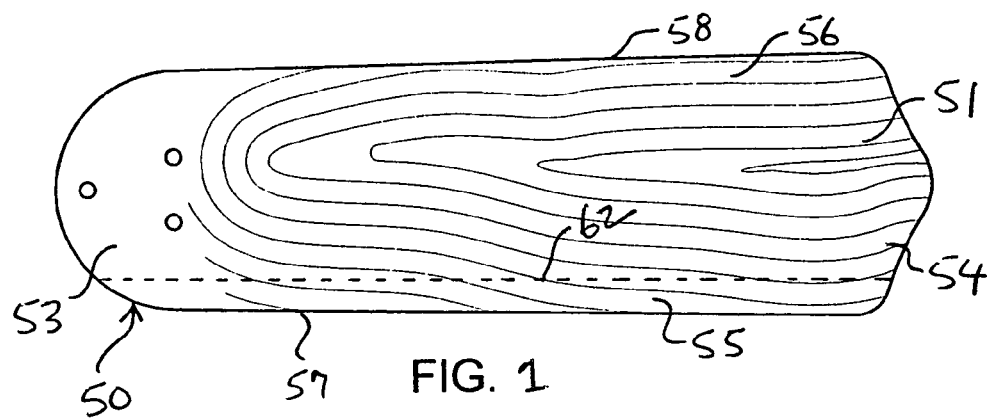
Figure 2:
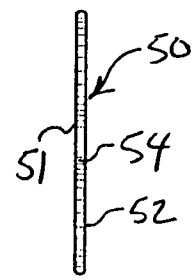

Turning now to the drawings, in which like reference characters indicate corresponding elements throughout the several views, attention is first directed to FIGS. 1-10 showing steps of a method of manufacturing a fan blade, in accordance with the principle of the invention. Referring first to FIG. 1, which is a top plan view of a fan blade blank 50, and also to FIG. 2, which is a front elevational view of fan blade blank 50, the method begins with providing fan blade blank 50, which, as seen in FIG. 2, includes opposed major faces 51 and 52. Referring specifically to FIG. 1, fan blade blank 50 further includes opposed inner and outer extremities 53 and 54, and opposed sides 55 and 56 defining opposed edges 57 and 58, respectively, which are substantially parallel relative to one another. Fan blade blank 50 is fashioned of wood or other cellulosic material or combination of materials, plastic, or the like, and can be fashioned from a single piece of material, two or more pieces of material, and can also be fashioned as a laminate structure consisting of united superimposed layers of material or a combination of materials. It is to be understood that fan blade blank 50 is exemplary of a conventional ceiling fan blade for use in conjunction with a ceiling fan.

According to the invention, the invention further specifies in FIGS. 3 and 4 cutting fan blade blank 50 asunder into two portions or parts 60 and 61 along a cut line 62 shown in FIG. 1 extending from inner extremity 53 of fan blade blank 50 to outer extremity 54 of fan blade blank 50 inboard of and substantially parallel to edge 57 forming a cut edge 63 of part 60 and a cut edge 64 of part 61. Fan blade blank 50 is cut with a cutting device, such as a hand saw, a power saw, or other suitable cutting device or instrument. Cut line 62, which is a dashed-line marking in this embodiment and that can be provided in other forms including an unbroken line, is applied to face 51 of fan blade blank 50, such as with a pencil, pen, or other writing instrument, or by printing or the like. If desired, cut line 62 can be applied to an adhesive sticker applied to face 51 of fan blade blank 50, in which case it is to be removed after cutting fan blade blank 50 into parts 60 and 61. For the purpose of reference, it is to be understood that FIG. 3 is a top plan view of fan blade blank 50 shown as it would appear having been cut asunder into parts 60 and 61, and that FIG. 4 is an enlarged sectional view taken along line 4-4 of FIG. 3 showing cut edges 63 and 64 of parts 60 and 61, respectively. In size, part 60 is smaller than part 61, in which case part 60 is considered a minor part and part 61 is considered a major part.

Figure 5:
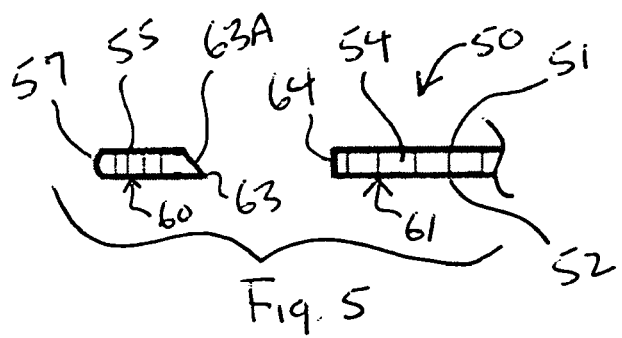

Looking now to FIG. 5, there is seen an enlarged fragmented sectional view of parts 60 and 61 much like that of FIG. 4. Considering FIG. 5, the method further specifies chamfering or beveling cut edge 63 forming a chamfered or beveled edge 63A. The chamfering or beveling is accomplished in a conventional manner, such as with a table saw, a rasp, a chamfering or beveling machine, etc.

Figure 6:
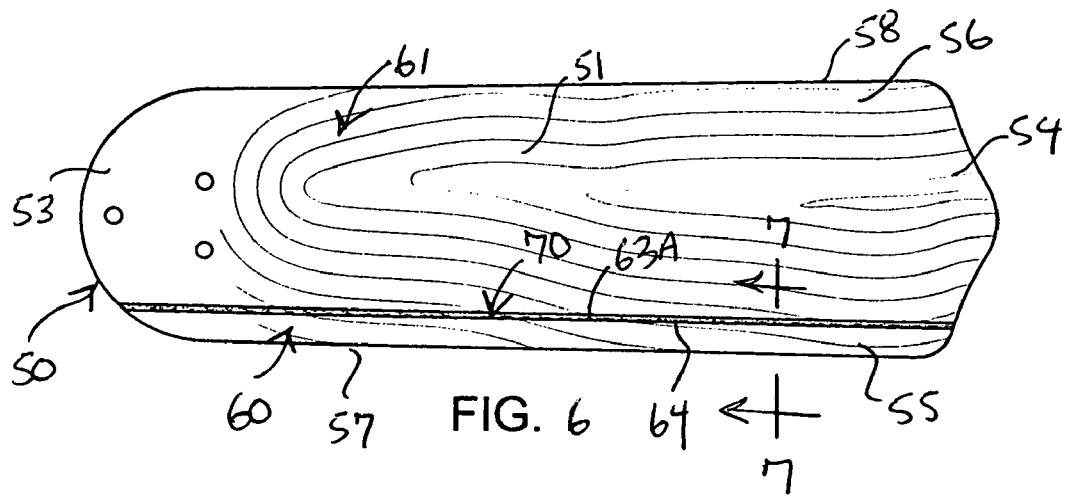
Figure 7:
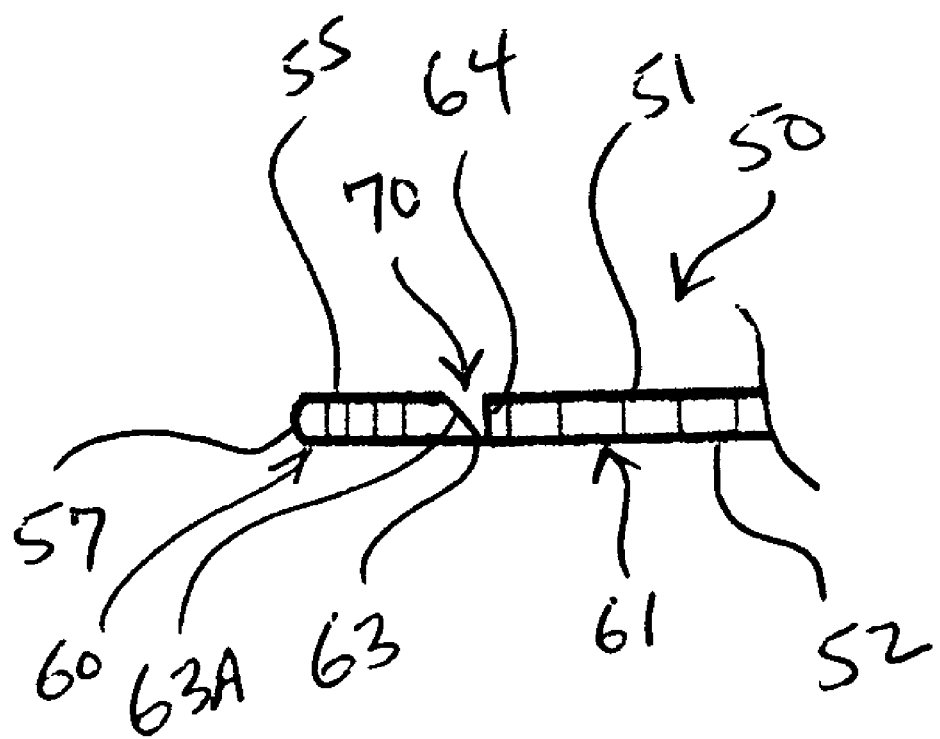

According to the invention, the invention further specifies in FIGS. 6 and 7 engaging chamfered edge 63A to cut edge 64 so as to form a valley or seam 70 therebetween. For the purpose of reference, it is to be understood that FIG. 6 is a top plan view of parts 60 and 61 in which chamfered edge 63A is shown abutting cut edge 64 forming seam 70 therebetween, and that FIG. 7 is an enlarged sectional view taken along line 7-7 of FIG. 6 in which chamfered edge 63A is shown abutting cut edge 64 forming valley or seam 70 therebetween.

Figure 8A:
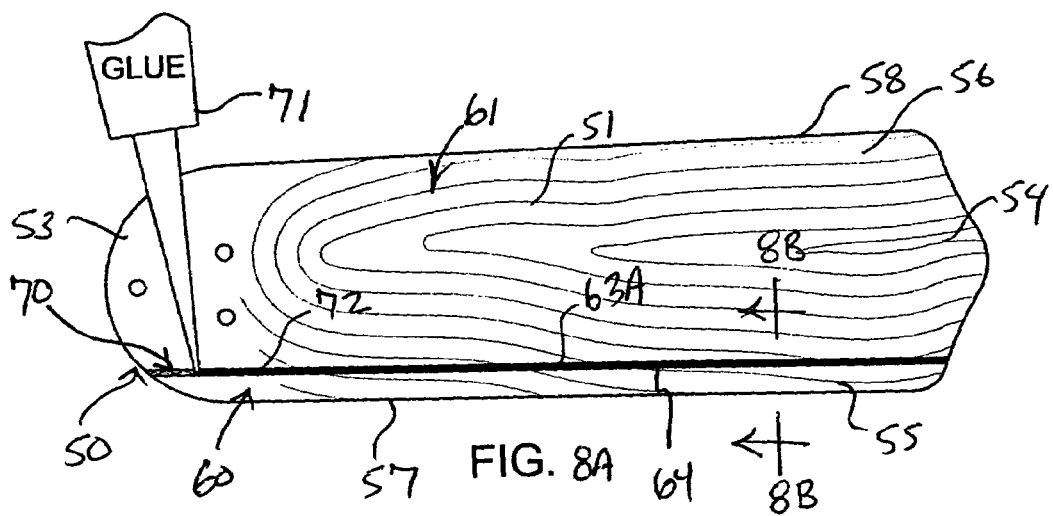
Figure 8B:
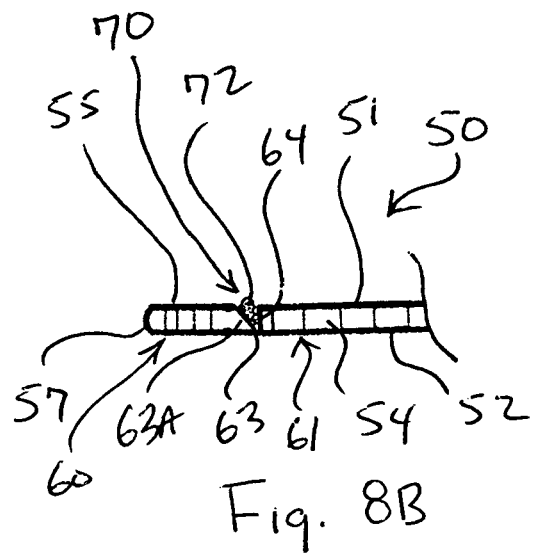
Figure 9:
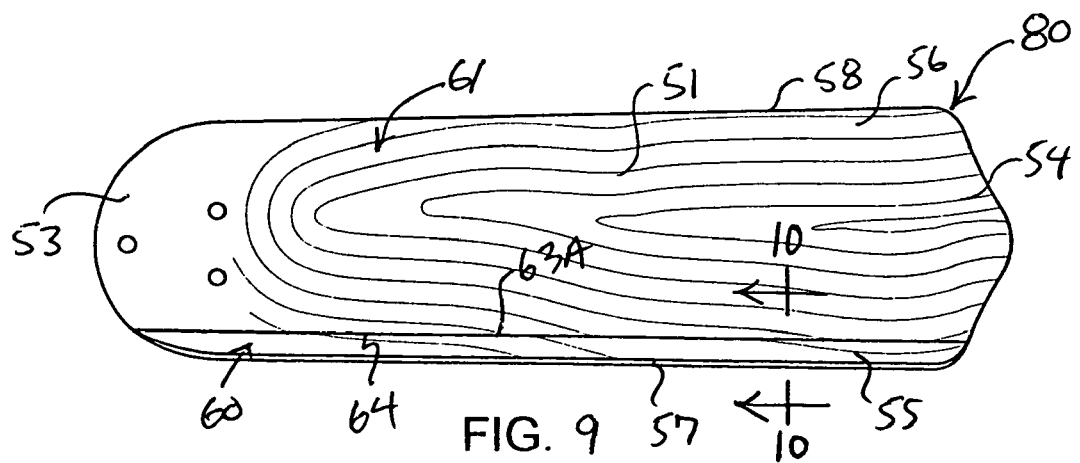
Figure 10:
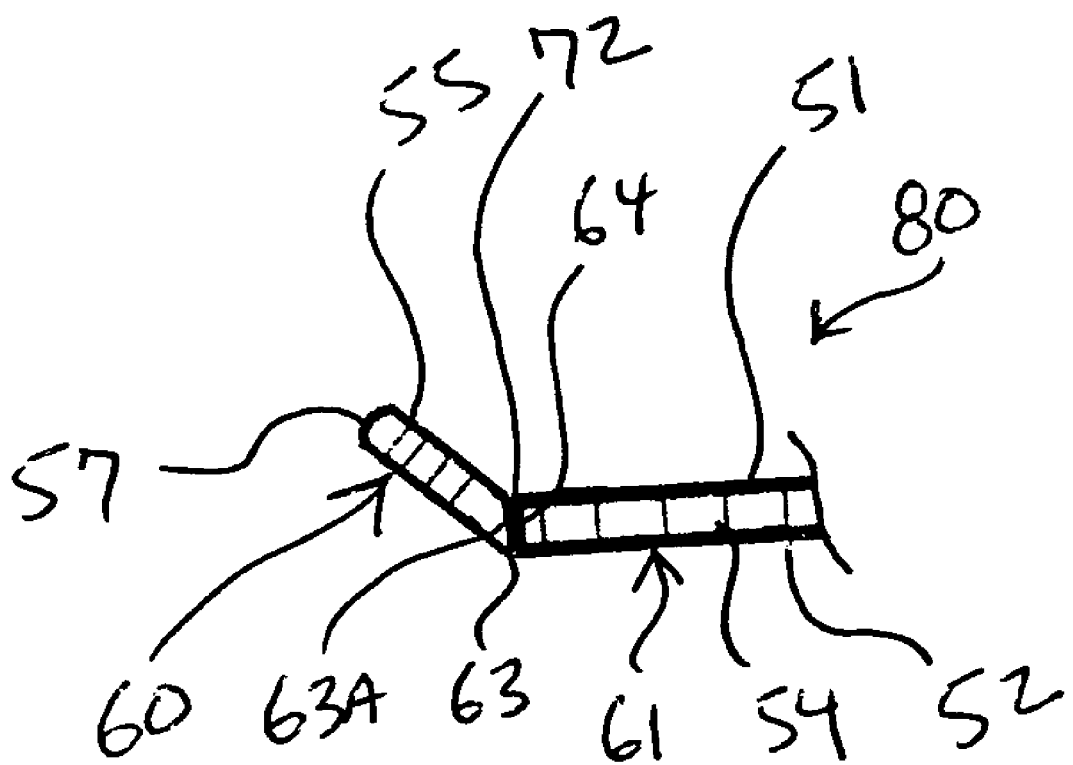

Having formed seam 70, the method next specifies in FIGS. 8A and 8B providing a source 71 of adhesive 72 (shown only in FIG. 8B), and applying adhesive 72 to seam 70. Adhesive 72 is a suitable, aggressive, and conventional adhesive, such as a suitable wood adhesive, a silicon-based adhesive, etc. For the purpose of reference, it is to be understood that FIG. 8A is a view very similar to the view of FIG. 6, in which adhesive 72 is shown as it would appear being applied to seam 70 from source 71, and that FIG. 8B is an enlarged sectional view taken along line 8B-8B of FIG. 8A showing adhesive 72 applied to seam 70. At this point, the method next specifies in FIGS. 9 and 10 presenting chamfered edge 63A flush up against cut edge 64, and then waiting for a period of time that is sufficient to allow adhesive 72 to set thus adhesively affixing chamfered edge 63A to cut edge 64 and thus adhesively affixing part 60 to part 61, thus forming a fan blade 80 and which ends the method. By bringing chamfered edge 63A flush up against cut edge 64, part 60 is angularly disposed relatively to part 61 as shown in FIG. 10, according to the principle of the invention. For the purpose of reference, it is to be understood that FIG. 9 is a top plan view of fan blade 80, and that FIG. 10 is an enlarged sectional view taken along line 10-10 of FIG. 9. As seen in FIG. 10, first part 60 is downturned away from face 52, and is correspondingly inturned relative to face 51, in which first part 60 forms a fixed-angled flap of fan blade 80. In a separate and different embodiment, first part 60 can be cut away and sized to be less than the entire length of fan blade 80, if desired.

The provision of chamfered edge 63A mating flush up against cut edge 64 forms the angle of part 60 relative to part 61, according to the invention. The angle of part 60 relative to part 61 can be any desired angle except, of course, a zero angle. The degree or angle to which chamfered edge 63A is taken to determines the angle of part 60 relative to part 61. If desired, cut edge 64 can also be chamfered for providing the desired angle of part 60 relative to part 61. Still further, although cut edge 63 is the edge that is chamfered in the present embodiment, this can be reversed, in which case cut edge 64 is chamfered rather than cut edge 63.

Fan blade 80 is a ceiling fan blade and is to be used in conjunction with a ceiling fan. It is to be understood that inner extremity 53 is an attachment end of fan blade 80 and that outer extremity 54 is the non-attachment or outer end of fan blade 80. According to conventional practice, inner extremity 53 is to be attached to the rotating hub of a ceiling fan in a conventional manner, whether directly or by way of a fan blade bracket attached to the hub. In a typical installation, fan blade 80 is mounted so as to dispose face 51 downwardly, in which case first part 60 is downturned. When the ceiling fan to which fan blade 80 is attached is activated, first part 60 acts against the air providing increased downward air movement. If desired, fan blade 80 can be mounted to a hub of a ceiling fan so as to dispose face 51 upwardly, in which case first part 60 is upturned. When the ceiling fan to which fan blade 80 is attached is activated, first part 60 acts against the air providing increased upward air movement.

It is to be understood that the foregoing method can be carried out in conjunction with side 56 of fan blade blank 50, either in lieu of side 55 or in addition to side 55. In the case in which the method is carried out with side 56, it is to be understood that the foregoing method discussed in conjunction with side 55 applies also to side 56. If the foregoing method is carried out in conjunction with side 55 and side 56 thus constituting an embodiment of the invention, it is preferred that the fixed angled flaps so formed are bent and angled in opposite directions, namely, one of them being bent upturned relative to face 51 and one of them being bent downturned relative to face 51.

Figure 11:
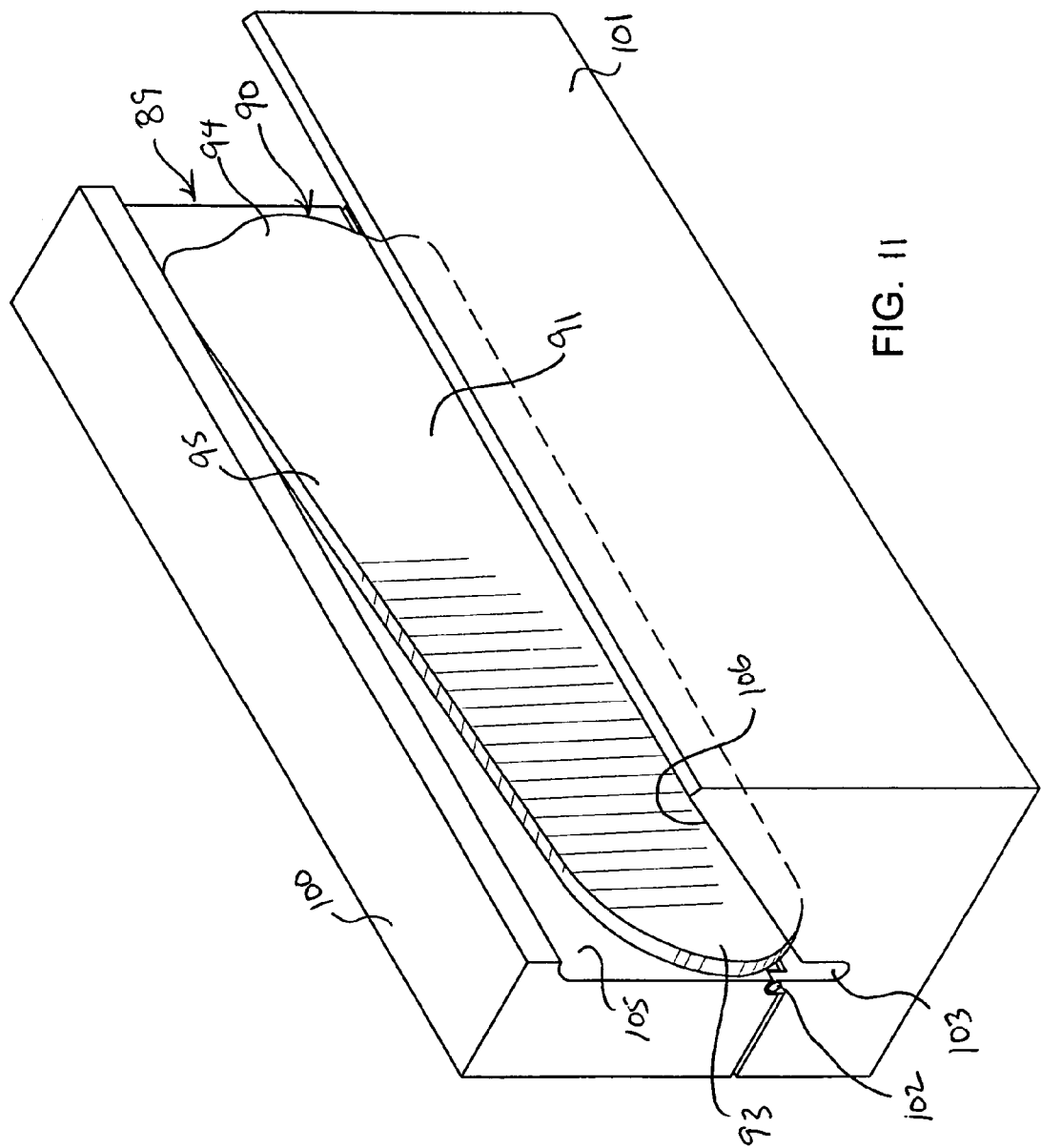
FIG. 11 is a perspective view of a fan blade shown as it would appear mounted to a bending device.
Figure 13:
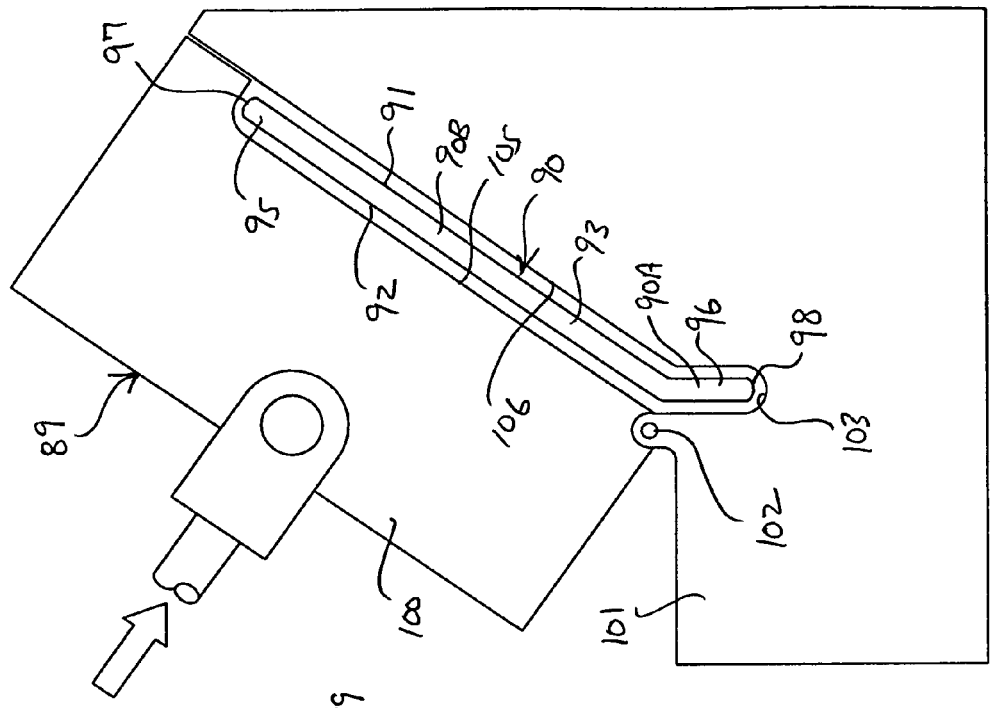
FIG. 13 is a view very similar to the view of FIG. 12 showing the fan blade as it would appear having been bent with the bending device.
Figure 12:
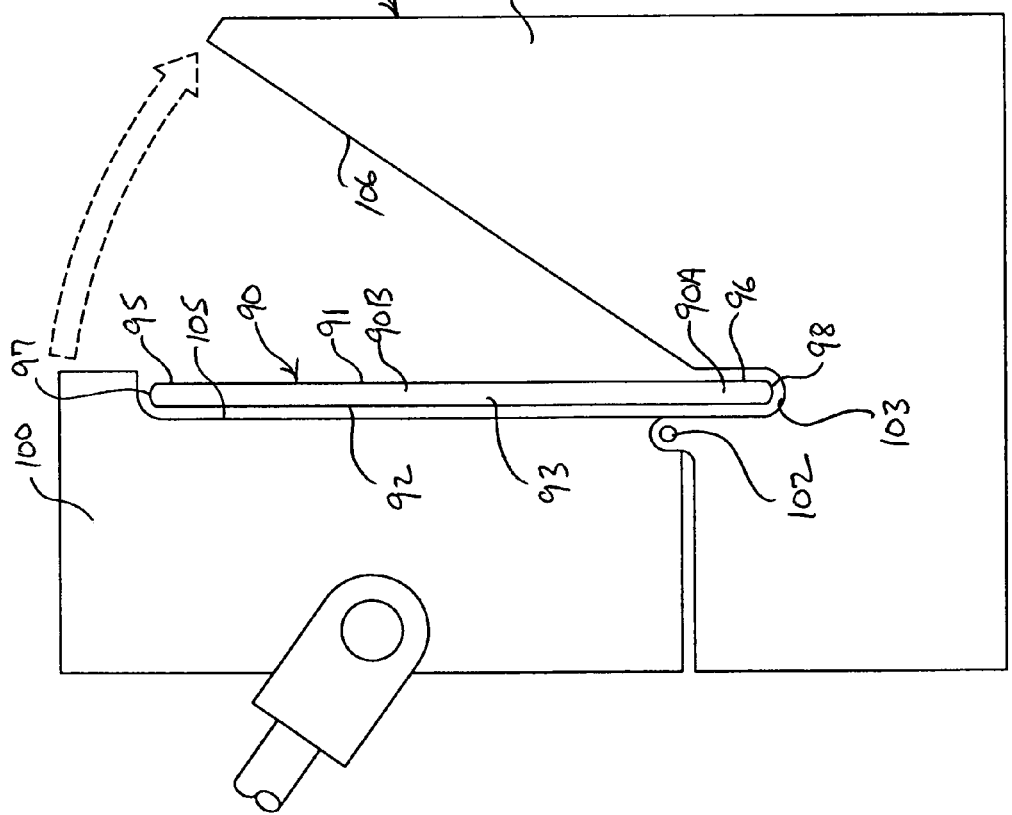
FIG. 12 is partially schematic end elevational view of the fan blade shown as it would appear mounted to the bending device of FIG. 11.
Figure 17:
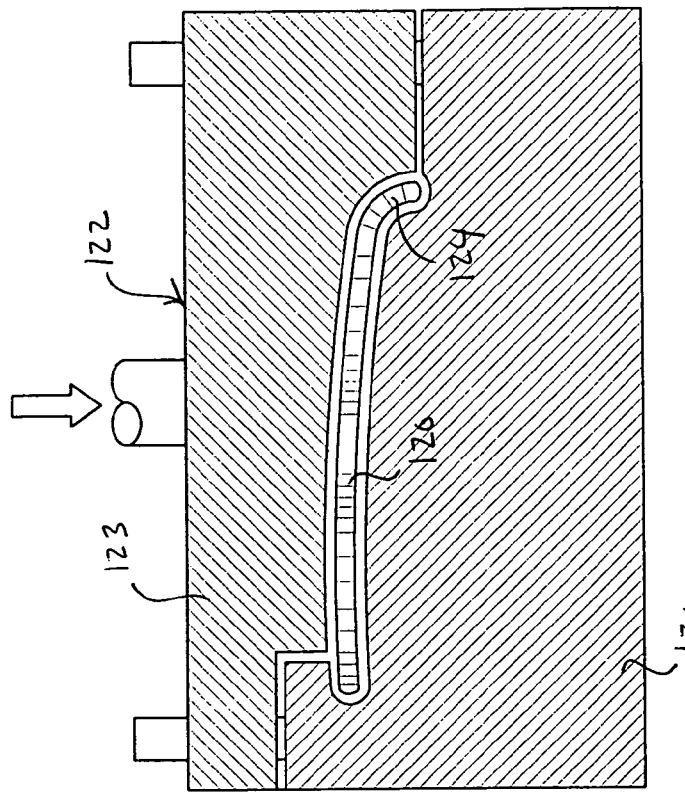
FIG. 17 is a view very similar to the view of FIG. 16 showing the fan blade as it would appear having been bent with the bending device.
Figure 16:
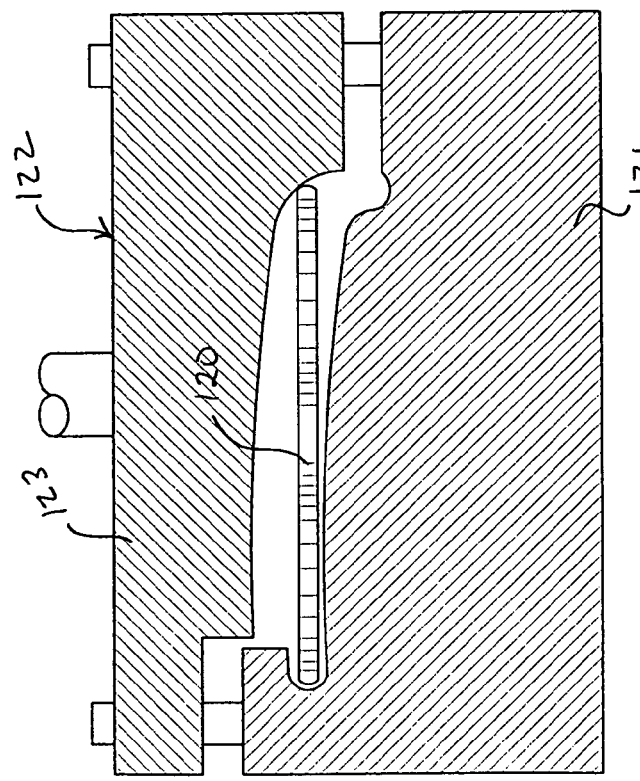
FIG. 16 is partially schematic end elevational view of a fan blade shown as it would appear mounted to a bending device.

According to the invention, reference is now made to FIGS. 11, 12, and 13, showing steps of another method of manufacturing a fan blade, in accordance with the principle of the invention. Referring first to FIG. 11 there is seen a perspective view of a fan blade 90 shown as it would appear mounted to a bending device 89. According to the invention, and with continuing reference to FIG. 11 and also to FIGS. 12 and 13, the method begins with providing fan blade 90, which includes opposed major faces 91 and 92. Referring specifically to FIG. 11, fan blade blank 90 further includes opposed inner and outer extremities 93 and 94, and opposed sides 95 and 96 defining opposed edges 97 and 98, respectively, which are substantially parallel relative to one another. Fan blade 90 is bendable and is thus fashioned of a bendable material or a combination of bendable materials. Suitable materials can include wood or other cellulosic material or combination of materials, plastic, or metal, and fan blade 90 can be fashioned from a single piece of material, two or more pieces of material, and can also be fashioned as a laminate structure consisting of united superimposed layers of material or a combination of materials. It is to be understood that fan blade 90 is exemplary of a conventional ceiling fan blade.

According to the invention, the invention further specifies in FIGS. 11, 12, and 13, providing bending device 91 having a first element 100 and a second element 101. First element 100 is pivotally attached to second element 101 by way of a conventional pivot point, attachment or joint 102. First and second elements 100 and 101 are fashioned of steel, aluminum or other substantially rigid material or combination of materials. First element 100 is considered the movable or moving component of bending device 89, and second element 101 is considered the non-moving component or base of bending device 89. An elongate groove 103 is formed into second element 101, and first and second elements 100 and 101 have opposing faces 105 and 106, respectively. First element 100 pivots and is movable about pivot point 102 between an open position away from second element 101 as shown in FIGS. 11 and 12, and a closed position toward second element 101 as shown in FIG. 13. In the open position of first element 100, face 105 of first element is disposed away from face 106 of second element 101. In the closed position of first element 100, face 105 of first element 100 confronts and is parallel to face 106 of second element 101 as shown in FIG. 13.

According to the invention, the method next specifies in FIGS. 11 and 12 placing first element 100 in its open position, and mounting fan blade 90 to bending device 89. To mount fan blade 90 to bending device 89, and with reference to FIG. 12, fan blade 90 is taken up, such as by hand or with some sort of mechanical handling apparatus, and is positioned onto bending device 89 in which edge 98 of fan blade 90 is disposed into groove 103, and in which face 92 of fan blade 90 confronts face 105. Groove 103 is formed having a specified depth, and it is to be understood that the portion of side 96 of fan blade 90 extending into groove 103 extends from inner extremity 93 to outer extremity 84, in which this described portion is considered a first portion 90A of fan blade 90. The portion of fan blade 90 projecting outwardly from groove 103 is considered a second portion 90B of fan blade 90. In size, first portion 90A is smaller than second portion 90B, such that first portion 90A is considered a minor part of fan blade 90 and second portion 90B is considered a major part of fan blade 90. First portion 90A a length of side 96 of fan blade 90 extending from inner extremity 93 to outer extremity 94 and being angled relative to second portion 90B.

At this point, the method next specifies moving first element 100 of bending device 89 relative to second element 101 of bending device 89 from its open position to its closed position as shown in FIG. 13. First element 100 can be moved by hand, or with the aid of a hand-operated device or a mechanized device, such as a piston assembly, a press, etc. As first element 100 is moved from its open position to its closed position, it acts on fan blade 90 bending first portion 90A of fan blade 90 relative to second portion 90B of fan blade, according to the principle of the invention, in which first portion 90A, being a length of side 96 of fan blade 90 extending from inner extremity 93 to outer extremity 94, is bent and disposed at an angle relative to second portion 90B. After bending fan blade 90, the method next specifies removing fan blade 90 from bending device 89 by moving first element 100 from its closed position to its open position and then taking up fan blade 90, such as by hand or with a mechanical handling apparatus, and removing it from bending device 89, which ends to the method.

As seen in FIG. 13, first portion 90A is downturned away from face 92 of fan blade 90, is correspondingly inturned relative to face 91 of fan blade 90, and constitutes a fixed-angled flap of fan blade 90. Face 106 of second element 101 is disposed at a specified angle relative to groove 103, and the provision of the angle of face 106 is determinative of the angle of first portion 90A of fan blade 90 relative to second portion 90B. It is to be understood that the angle of first portion 90A of fan blade 90 relative to second portion 90B of fan blade 90 can be any desired angle except, of course, a zero angle, and the selected angle of first portion 90A relative to second portion 90B can be determined by the selective operation of bending device 89 and/or providing face 106 of second element 101 at a predetermined angle relative to groove 103.

Fan blade 90 is a ceiling fan blade and is to be used in conjunction with a ceiling fan. It is to be understood that inner extremity 93 is an attachment end of fan blade 90 and that outer extremity 94 is the non-attachment or outer end of fan blade 90. According to conventional practice, inner extremity 93 is to be attached to the rotating hub of a ceiling fan in a conventional manner, whether directly or by way of a fan blade bracket attached to the hub. In a typical installation, fan blade 90 is mounted so as to dispose face 91 downwardly, in which case first portion 90A is downturned. When the ceiling fan to which fan blade 90 is attached is activated, first portion 90A acts against the air providing increased downward air movement. If desired, fan blade 90 can be mounted to a hub of a ceiling fan so as to dispose face 91 upwardly, in which case first part 60 is upturned. When the ceiling fan to which fan blade 90 is attached is activated, first portion 90A acts against the air providing increased upward air movement.

It is to be understood that the foregoing method can be carried out in conjunction with side 95 of fan blade 90, either in lieu of side 96 or in addition to side 96. Accordingly, in the case in which the method is carried out with side 95, it is to be understood that the foregoing method discussed in conjunction with side 96 of fan blade 90 also applies to side 95 of fan blade 90. When the foregoing method is carried out in conjunction with side 95 and side 96 forming an embodiment of the invention, it is preferred that the fixed angled flaps so formed are angled in opposite directions, namely, one of them being bent upturned relative to face 91 and one of them being bent downturned relative to face 91.

Bending device 89 is shown as a matter of an example a suitable bending device. The configuration of bending device 89 is intended to show one such configuration of a bending device that can be used for bending a bendable fan blade as herein discussed. It is to be understood that any bending device capable of bending a fan blade in the manner herein generally described can be used without departing from the invention. Furthermore, although first element 100 of bending device 89 is the moving component of bending device 89 and the second element 101 is the non-moving component of bending device 89, this can be reversed. Moreover, first and second elements 100 and 101 of bending device 89 can, if desired, be configured as both moving, coactive components. Although it is preferred to bend fan blade 90 according to the invention using a bending device, it will be readily understood that fan blade 90 can be bent in other ways according to the invention, such as be hand, so as to form one or more fixed angled flaps in it.

As a matter of example of other bending devices, reference is made to FIGS. 14-17. Considering first FIGS. 14 and 15, a bendable fan blade 110 is mounted to a first element or base 111 of a bending device 112, in which the bending device 112 has a movable or second element 113 confronting a side of fan blade 110 that is movable between an open position as in FIG. 14 and a closed position as in FIG. 15 acting on the side of fan blade 110 bending it forming a fixed angle flap 114. Considering now FIGS. 16 and 17, a bendable fan blade 120 is mounted to a first element or base 121 of a bending device 122, in which the bending device 122 has a movable or second element 123 confronting a side of fan blade 120 that is movable between an open position as in FIG. 16 and a closed position as in FIG. 17 acting on the side of fan blade 120 bending it forming a fixed angle flap 124. In view of FIGS. 14-17, those having regard for the art will readily appreciate that any suitable bending device can be used for forming a fixed angle flap into a bendable fan blade without departing from the invention.

According to the invention, reference is now made to FIGS. 18-22 showing steps of another method of manufacturing a fan blade, in accordance with the principle of the invention. Referring first to FIG. 18, which is a top plan view of a fan blade 150, and also to FIG. 19, which is a front elevational view of fan blade 150, the method begins with providing fan blade 150, which, as seen in FIG. 19, includes opposed major faces 151 and 152. Referring specifically to FIG. 18, fan blade 150 further includes opposed inner and outer extremities 153 and 154, and opposed sides 155 and 156 defining opposed edges 157 and 158, respectively, which are substantially parallel relative to one another. Fan blade 150 is bendable and is thus fashioned of a bendable material or a combination of bendable materials. Suitable materials can include wood or other cellulosic material or combination of materials, plastic, or metal, and fan blade 150 can be fashioned from a single piece of material, two or more pieces of material, and can also be fashioned as a laminate structure consisting of united superimposed layers of material or a combination of materials. It is to be understood that fan blade 150 is exemplary of a conventional ceiling fan blade.

According to the invention, the invention further specifies in FIG. 18 forming a notch 160 in fan blade 150. Notch 160 is located adjacent inner extremity 153 and extends into fan blade 150 from edge 157 of side 155 of fan blade 150 and through fan blade 150 from major face 151 to major face 152. Notch 160 is cut into fan blade 150, such as with a hand saw, a power saw, or other suitable cutting device or instrument.

Figure 20:
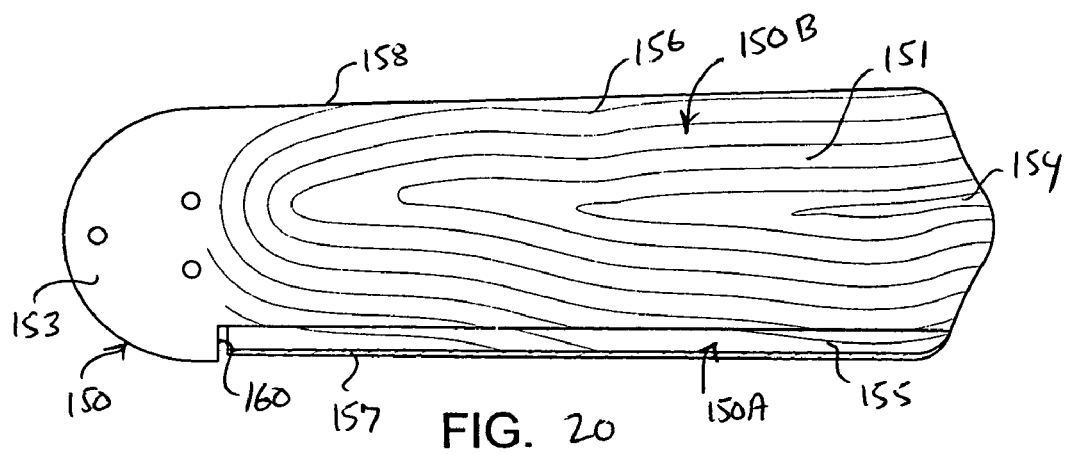
Figure 21:
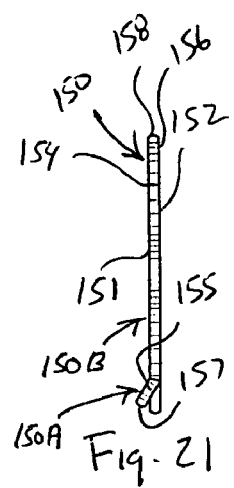

After forming notch 160, the method next specifies in FIG. 20 bending a first portion 150A of fan blade 150 relative to a second portion 150B of fan blade 150, in which first portion 150A is a length of side 155 of fan blade 150 extending from notch 160 to outer extremity 154, which ends the method. In size, first portion 150A is smaller than second portion 150B, and first portion 150A is considered a minor part of fan blade 150 and second portion 150B is considered a major part of fan blade 150. For the purpose of reference, it is to be understood that FIG. 20 is a top plan view of fan blade 150, and that FIG. 21 is an enlarged sectional view taken along line 21-21 of FIG. 20. As seen in FIG. 21, first part 150A is downturned away from face 152, and is correspondingly inturned relative to face 151. As previously explained, first part 150A forms a fixed-angled flap of fan blade 150. first part 150A has a length that is less than the length of fan blade 150 from inner extremity 153 to outer extremity 154, and the provision of notch 160 provides the ability to not only define first portion 150A but also bend first portion 150A. It is to be understood that the angle of first portion 150A of fan blade 150 relative to second portion 150B of fan blade 150 can be any desired angle except, of course, a zero angle.

Fan blade 150 is a ceiling fan blade and is to be used in conjunction with a ceiling fan. It is to be understood that inner extremity 153 is an attachment end of fan blade 150 and that outer extremity 154 is the non-attachment or outer end of fan blade 150. According to conventional practice, inner extremity 153 is to be attached to the rotating hub of a ceiling fan in a conventional manner, whether directly or by way of a fan blade bracket attached to the hub. In a typical installation, fan blade 150 is mounted so as to dispose face 151 downwardly, in which case first portion 150A is downturned. When the ceiling fan to which fan blade 150 is attached is activated, first portion 150A acts against the air providing increased downward air movement. If desired, fan blade 150 can be mounted to a hub of a ceiling fan so as to dispose face 151 upwardly, in which case first part 150A is upturned. When the ceiling fan to which fan blade 150 is attached is activated, first portion 150A acts against the air providing increased upward air movement.

Figure 22:
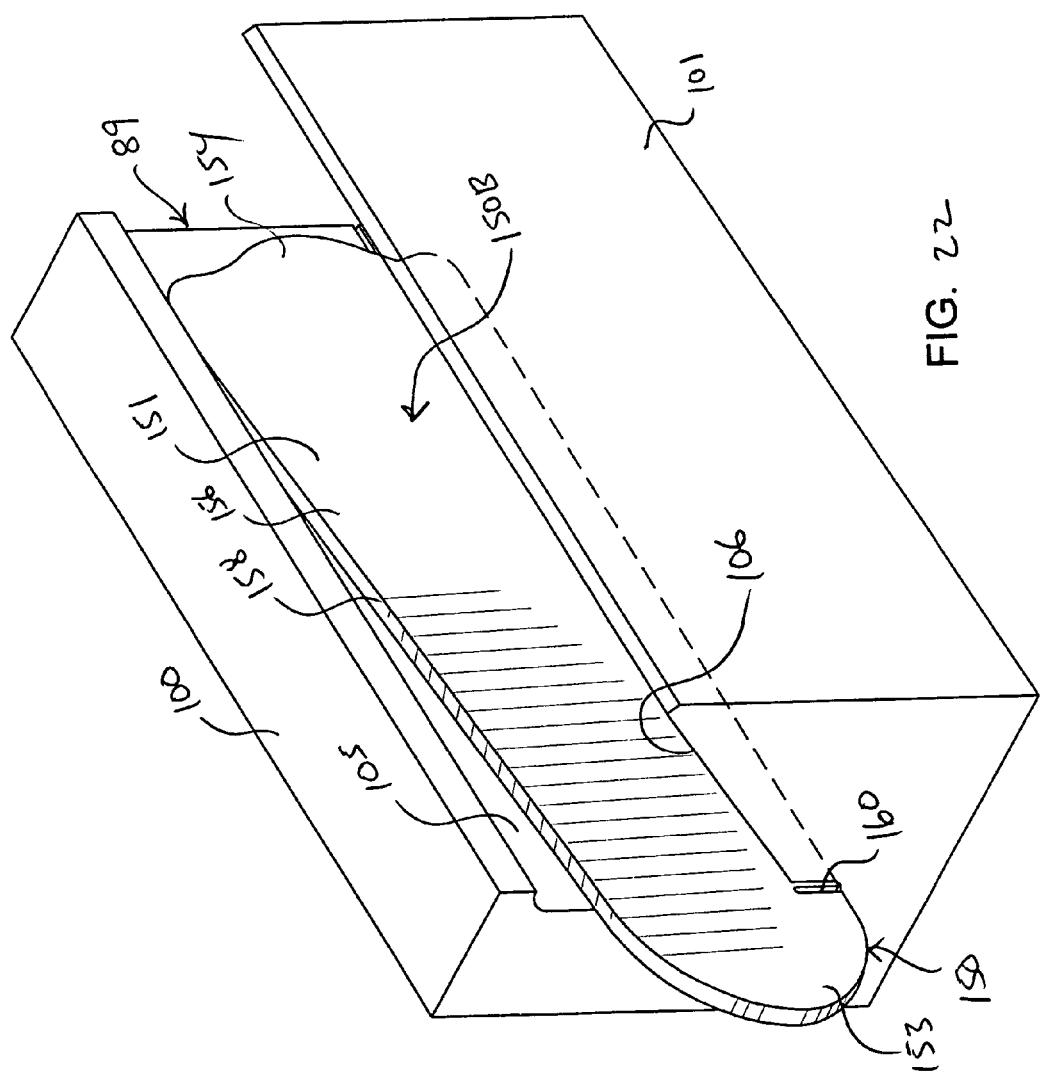

The bending of fan blade 150 is preferably carried out with a bending device, and FIG. 22 is an example of this. In FIG. 22, fan blade 150, with notch 160 formed therein, is shown as it would appear mounted to bending device 89, which was discussed previously in conjunction with FIGS. 11, 12, and 13. To mount fan blade 150 to bending device 89, and with continuing reference to FIG. 12, fan blade 150 is taken up, such as by hand or with some sort of mechanical handling apparatus, and is positioned onto bending device 89 disposing edge 157 of fan blade 150 into groove 103 such that face 152 of fan blade 150 confronts face 105. Groove 103 is formed having a specified depth, and first portion 150A of side 155 of fan blade 150 extends into groove 103, namely, that portion of side 155 of fan blade 150 from notch 160 to outer extremity 154. Second portion 150B of fan blade 150 projects outwardly from groove 103. After having mounted fan blade 150 to bending device 89, the bending of fan blade 150 is caused by moving element 100 of bending device 89 relative to second element 101 of bending device 89 from its open position to its closed position. As first element 100 is moved from its open position to its closed position, it acts on fan blade 150 bending first portion 150A of fan blade 150 relative to second portion 150B of fan blade 150, in which first portion 150A, being a length of side 155 of fan blade 90 extending from notch 160 to outer extremity 154, is bent and disposed at an angle relative to second portion 150B. After bending fan blade 150, the method next specifies removing fan blade 150 from bending device 89 by moving first element 100 from its closed position to its open position and then taking up fan blade 150, such as by hand or with a mechanical handling apparatus, and removing it from bending device 89, which ends to the method.

It is to be understood that any bending device, including, for instance, bending devices 112 and 122 previously discussed, capable of bending a fan blade in the manner herein generally described in conjunction with fan blade 150 can be used without departing from the invention. Although it is preferred to bend fan blade 150 according to the invention using a bending device, it will be readily understood that a fan blade can be bent in other ways according to the invention, such as be hand, so as to form one or more fixed angled flaps.

It is to be understood that the foregoing method can be carried out in conjunction with side 156 of fan blade 90, either in lieu of side 155 or in addition to side 155. When the foregoing method is carried out in conjunction with side 155 and side 156 in an exemplary embodiment of the invention, it is preferred that the fixed angled flaps so formed are angled in opposite directions, namely, one of them being bent upturned relative to face 151 and one of them being bent downturned relative to face 151. Accordingly, it is to be understood that in an embodiment in which the method is carried out in conjunction with both of sides 155 and 156, that the foregoing method discussed in conjunction with side 155 of fan blade 150 also applies to side 156 of fan blade 150, such that the opposing bent portions are bent in opposite directions.

The invention has been described above with reference to preferred embodiment. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A method of manufacturing a fan blade, comprising steps of:
   providing a fan blade blank having a first air movement characteristic defined by a first overall shape of the fan blade blank characterized by the fan blade blank including:
      opposed major faces,
      opposed inner and outer extremities, and
      opposed first and second sides defining opposed first and second edges, respectively;
   cutting the fan blade blank asunder into first and second parts along a cut line extending from the inner extremity of the fan blade blank to the outer extremity of the fan blade blank inboard of and substantially parallel to one of the first and second edges forming a first cut edge of one of the first and second parts and a second cut edge of the other of the first and second parts;
   chamfering one of the first and second cut edges forming a chamfered one of the first and second cut edges; and
   affixing the chamfered one of the first and second cut edges to the other of the first and second cut edges forming a fan blade having a second air movement characteristic defined by a second overall shape of the fan blade characterized by the first part affixed to the second part, the first part being angled relative to the second part comprising an angled part of the fan blade lacking in the fan blade blank thereby providing the fan blade with the second air movement characteristic greater than the first air movement characteristic of the fan blade blank defined by the second overall shape of the fan blade different from the first overall shape of the fan blade blank.

2. The method according to claim 1, wherein the step of affixing the chamfered one of the first and second cut edges to the other of the first and second cut edges further includes adhesively affixing the chamfered one of the first and second cut edges to the other of the first and second cut edges.

* * * * *